US006724605B1

(12) United States Patent
Boy et al.

(10) Patent No.: US 6,724,605 B1
(45) Date of Patent: Apr. 20, 2004

(54) GAS-FILLED SURGE DIVERTER WITH ELECTRODE CONNECTIONS IN THE SHAPE OF BAND-TYPE CLIPS

(75) Inventors: Jürgen Boy, Berlin (DE); Peter Bobert, Falkensee (DE)

(73) Assignee: Epcos AG, Münich (DE)

( * ) Notice: Subject to any disclaimer, the term of this patent is extended or adjusted under 35 U.S.C. 154(b) by 6 days.

(21) Appl. No.: 10/018,442

(22) PCT Filed: Jun. 7, 2000

(86) PCT No.: PCT/DE00/01862

§ 371 (c)(1), (2), (4) Date: Dec. 12, 2001

(87) PCT Pub. No.: WO00/77900

PCT Pub. Date: Dec. 21, 2000

(30) Foreign Application Priority Data

Jun. 16, 1999 (DE) .......................................... 199 28 322

(51) Int. Cl.[7] .................................................. H02H 9/06

(52) U.S. Cl. ....................... 361/120; 361/117; 361/118; 361/129; 361/130

(58) Field of Search ................................ 361/120, 115, 361/117, 118, 123, 56, 91, 122, 129, 130, 126, 127, 128, 119, 112, 111; 313/170

(56) References Cited

U.S. PATENT DOCUMENTS

| | | | | |
|---|---|---|---|---|
| 3,885,203 | A | | 5/1975 | Baker et al |
| 4,212,047 | A | | 7/1980 | Napiorkowski |
| 4,266,260 | A | | 5/1981 | Lange et al. |
| 4,491,893 | A | * | 1/1985 | Toda |
| 4,493,004 | A | * | 1/1985 | Lange et al. |
| 4,984,125 | A | | 1/1991 | Uwano |
| 5,142,194 | A | | 8/1992 | Jacubeit et al. |
| 5,388,023 | A | | 2/1995 | Boy et al. |
| 5,633,777 | A | | 5/1997 | Boy et al. |
| 5,768,082 | A | | 6/1998 | Lange et al. |

FOREIGN PATENT DOCUMENTS

| | | |
|---|---|---|
| DE | 7114566 | 4/1971 |
| DE | 2 103 007 | 8/1972 |
| DE | 27 49 392 | 5/1979 |
| DE | 34 10 610 | 9/1985 |
| DE | 43 18 366 | 10/1994 |
| DE | 44 26 591 | 2/1995 |
| DE | 195 28 140 | 11/1996 |
| DE | 196 41 385 | 4/1997 |
| EP | 0 378 963 | 6/1994 |
| FR | 2 408 211 | 6/1979 |

* cited by examiner

*Primary Examiner*—Dean A. Reichard
*Assistant Examiner*—Nguyen T. Ha
(74) *Attorney, Agent, or Firm*—Schiff Hardin LLP

(57) ABSTRACT

In order to simplify the mountability of electrode terminals in the form of band-like clips on either two-electrode or three-electrode arresters, the clips are resiliently fashioned in a circumferential direction. When such a clip axially projects beyond a foot part of the respective end electrode, the projecting region in a three-electrode arrester can be part of a short-circuit device which electrically connects to the middle electrode, potentially in combination with an auxiliary discharge path.

20 Claims, 2 Drawing Sheets

GAS-FILLED SURGE DIVERTER WITH ELECTRODE CONNECTIONS IN THE SHAPE OF BAND-TYPE CLIPS

BACKGROUND OF THE INVENTION

The invention is in the field of over-voltage protection for communication networks and is concerned with the structural design of the power feed elements to the electrodes of a gas-filled surge arrester.

For protection against over-voltages as can occur, among other things, due to lightning strikes, gas-filled surge arresters are employed in communication networks and the appertaining devices that comprise one or two or, respectively, three discharge paths and, for this purpose, are composed of two end electrodes and, potentially, of a further electrode in the form of a middle electrode as well as of one or two hollow-cylindrical ceramic insulators.

In two-electrode surge arresters, the ceramic insulator usually has its end face soldered to the end electrodes (see U.S. Pat. No. 4,266,260 A). In three-electrode surge arresters, the ceramic insulators are soldered at their circumferential end faces to both the middle electrode as well as to a respective end electrode (see U.S. Pat. No. 3,885,203 A and U.S. Pat. No. 4,212,047 A). The contacting of the electrodes at their outer circumference usually occurs either within a housing with the assistance of resilient clamps or with the assistance of leads that have their one end soldered or welded tangentially, radially or axially to a respective electrode and have their other end provided with a pluggable contact element or fashioned for a soldering (see U.S. Pat. No. 4,212,047 and U.S. Pat. No. 4,984,125 A). In order to fashion the power feed elements in gas-filled surge arresters of the higher performance category so that they are also sure to withstand extreme current loads, it is also known to employ power feed elements in the form of a band-like clip that are fixed to the circumference of the surge arrester with a releasable clamp closure. A riveting or an ultrasound welding also come into consideration as a non-releasable clamp closure. In addition, the band-like clips can be fashioned so broad that they embrace not only the electrically conductive foot region of the respective end electrode but also the adjoining ceramic insulator over a respective part of the axial length of the insulator. As a result thereof, the electrical behavior of the surge arrester can be positively influenced (see DE 196 41 385 A1/U.S. Pat. No. 5,768,082 A).

It is also known to arrange additional component parts at the face end of the end electrodes of three-electrode arresters in order to realize a short-circuit device (fail safe mechanisms) and/or in order to connect auxiliary discharge paths electrically parallel to the gas discharge paths. For radial fixing of the component parts, specific designs in the foot region of the end electrodes and a cap that resides under the influence of a spring and is electrically connected to the middle electrode of the surge arrester are employed (see U.S. Pat. No. 5,388,023 A; U.S. Pat. No. 5,633,777 A and U.S. Pat. No. 4,984,125 A/FIG. 1*a*).

SUMMARY OF THE INVENTION

For a gas-filled surge arrester having band-like clips, the invention is based on the object of simplifying the mountability of the band-like clips and to thereby expand their function as far as possible.

For achieving this object, it is first provided that each clip allocated to an end electrode is resiliently fashioned in the circumferential direction. This can be realized, for example, in that clip is provided with a two-leg, clamp-like batter or bend. The clip can also be lent the form of a cap that comprises a hollow-cylindrical edge region and a planar cover region provided with a center opening, whereby the edge region has its circumference provided with a plurality of bead-like impressed portions that lie against the foot part of the respective end electrode. Given such a design of the clip, the electrical terminal of the respective end electrode can be prefabricated in the framework of an automatic manufacturing sequence and can also be slipped onto the respective end electrode. The spring tension of the clip thereby suffices in order to assure a reliable contacting of the respective end electrode given normal and medium current load.

A clip fashioned according to the invention can also exercise other functions when it is utilized for contacting given three-electrode arresters and is fashioned broad enough. In this case, the clip can be put in place on the surge arrester so that the chip projects axially beyond the foot part of the respective end electrode by a certain length. Parts of a short-circuit device electrically connected to the middle electrode can be allocated to this projecting region of the clip, as can, additionally, parts of an auxiliary discharge path connected electrically parallel to the gas discharge path. To this end, a fusion disk and a spacer are arranged within the projecting region of the clip. With a clip with a clamp-like batter or bend, a disk-shaped auxiliary electrode can also be allocated to the clip and has a diameter of at least equal to the outside diameter of the clip. The auxiliary electrode is held spaced from the edge of the clip by the fusion disk and the spacer and is pressed against the spacer by a spring. This spring can be a matter of a known spring clip (see FIG. 1 of U.S. Pat. No. 4,984,125). However, a coil spring or a spring washer can also be employed and is fixed by a U-shaped shackle secured to the middle electrode. In a known way, the spacer holding the disk-shaped auxiliary electrode spaced from the edge of the clip can be an insulating member or—preferably—a varistor (see FIG. 1 of U.S. Pat. No. 5,388,023).

Instead of a disk-shaped auxiliary electrode, a cap-like auxiliary electrode (similar to part 37 of FIG. 3 of U.S. Pat. No. 5,633,777 and part 15 of FIG. 1 of U.S. Pat. No. 5,388,023) can also be provided and is under the influence of a spring clip electrically connected to the middle electrode. The cap-like electrode has an edge projecting into the projecting region of the clip, accepts the fusion disk and the spacer, and is held insulated and spaced from the clip by a ring-like insulator part.

In the case of a clip in the form of a cap, the short-circuit device is formed by the planar cover surface of the cap and by a free end of a spring clip which is connected to the center electrode and which free end engages into the center opening of the cap. The free end of the spring clip is held spaced from the planar cover surface of the cap by means of a fusion disk and the auxiliary discharge path that are arranged within the cap, and the fusion disk or the auxiliary discharge path is insulated from the planar cover surface of the cap by means of an insulating centering member. The auxiliary discharge path is composed of a varistor that is arranged in the cap and insulated from the cap by the insulating centering member. However, a perforated mica folium can also serve as auxiliary discharge path and the fusion disk, which lies thereagainst, is insulated from the cap.

A number of exemplary embodiments of surge arresters fashioned according to the invention are shown in FIGS. 1 through 8.

DESCRIPTION OF THE PREFERRED EMBODIMENTS

Figure 1:
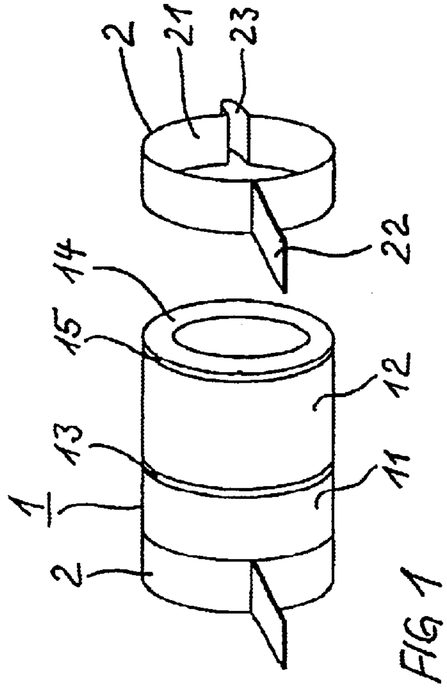
FIG. 1 is a perspective view of a three-electrode arrester with a first embodiment of clip allocated to the end electrodes.

FIG. 1 shows a schematic illustration of a three-electrode arrester 1 that comprises the two ceramic insulators 11 and 12 at both sides of a middle electrode 13 and on whose one end electrode (not shown) an electrical terminal in the form of a tightly fitting clip 2 is put in place. An identical clip 2 is shown next to the end electrode 14. This clip, which is composed of an annular metal band 21 whose ends are soldered or welded to form a radially projecting terminal 22, has its circumference provided with a two-legged, clamp-like batter or protrusion 23 lying approximately opposite the terminal 22, as a result whereof the clip 2 is rendered resilient in a circumferential direction. The clip can be slipped onto the flange-like foot part 15 of the end electrode 14, whereby the dimensions of the foot part 15 of the end electrode 14 and of the clip 2 are selected so that an adequate contact pressure is established. In particular, the diameter of the foot part 15 should be slightly larger than the diameter of the ceramic insulator 11 or, respectively, 12.

Figure 2:
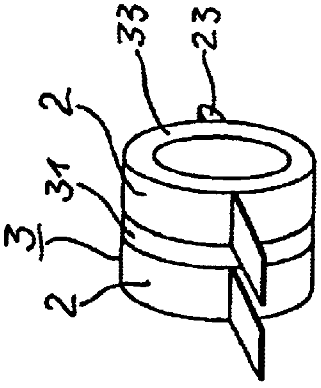
FIG. 2 is a perspective view of a two-electrode arrester with a first embodiment of clip allocated to the two electrodes.

FIG. 2 shows a two-electrode arrester that comprises a ceramic insulator 31, a first end electrode 33 as well as a second end electrode (not shown in detail) and a resiliently fashioned clip 2 is put in place on each end electrode.

Figure 3:
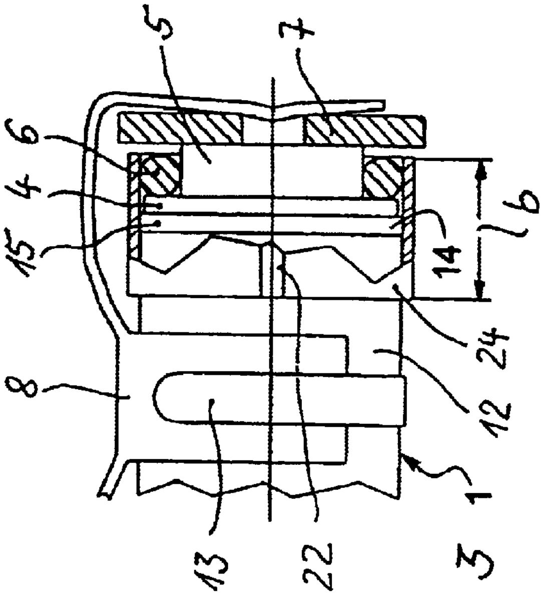
FIG. 3 is a partial side view with portions broken away of a three-electrode arrester having clips according to FIG. 1 and with the short-circuit device, which is combined with an auxiliary discharge path, being allocated to an end electrode.

FIG. 3 shows portions of a three-electrode arrester according to FIG. 1 that is augmented by a short-circuit device and combined with auxiliary discharge paths. In this case, the width b of the clip 24 put in place onto the foot 15 of the end electrode 14 is selected so large that the clip not only embraces a part of the surface of the ceramic insulator 12 but also projects axially beyond the end electrode 14. As a result thereof, a cylindrical space is formed in which a disk 4 of a fusible material and a spacer 5 in the form of a varistor are arranged. The spacer 5 is arranged and centered within the clip 24 by means of a rubber-like ring 6. The assembly composed of the fusion disk 4 and the varistor 5 also has a centrally perforated auxiliary electrode 7 allocated to it and the electrode 7 lies against the spacer/varistor 5 and is held by the free end of a spring clip 8 fixed to the middle electrode 13. The fusion disk 4 melts in case of an overload, whereupon the auxiliary electrode 7 contacts the edge of the clip 24.

Figure 4:
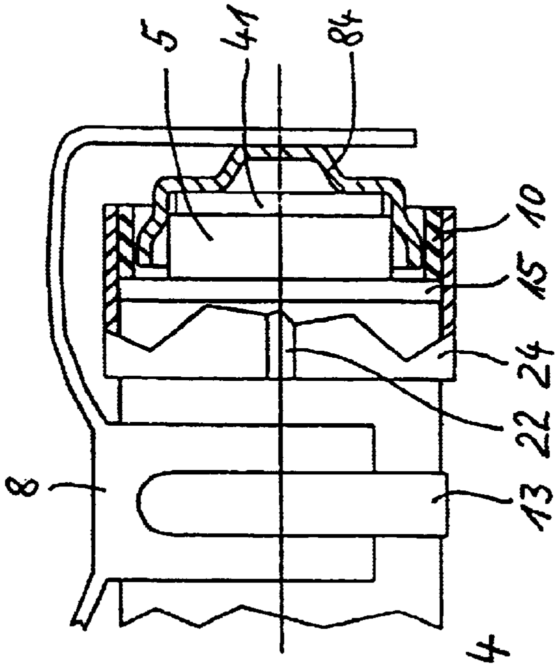
FIG. 4 is a partial side view with portions broken away of a modification of the device of FIG. 3 with an auxiliary electrode fashioned as cap.

FIG. 4 shows a modification of the device of FIG. 3, whereby the critical difference is that a cap-shaped auxiliary electrode 84 is provided instead of a disk-shaped auxiliary electrode 7, a fusion disk 41 and a spacer/varistor 5 are arranged in the auxiliary electrode 84 and an edge 85 of the electrode 84 is residing opposite the foot part 15 of the end electrode within the projecting region of the clip 24. The auxiliary electrode 84 is arranged and centered by an insulating ring 10 and is held spaced and insulated from the clip 24.

Figure 5A:
FIG. 5A is a side view of the spring washer in a relaxed condition.
Figure 5:
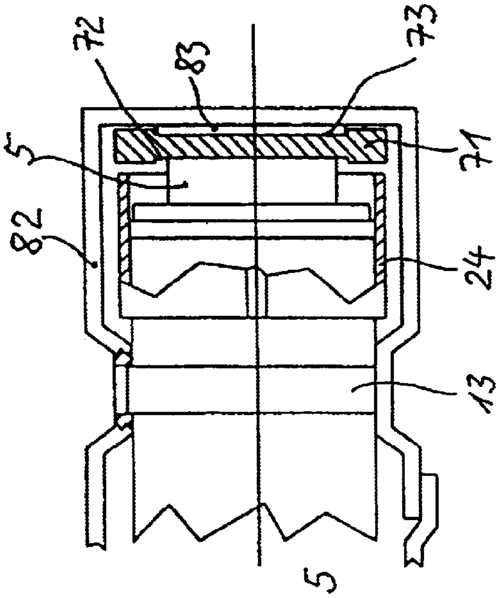
FIG. 5 is a partial side view with portions broken away of another modification of the device of FIG. 3 with rigid retainer shackle for the short-circuit device and a spring washer allocated to the auxiliary electrode.

FIG. 5 shows another modification of the device of FIG. 3, whereby the critical difference is that the contact to the middle electrode 13 is produced via a non-resilient, U-shaped shackle 82 that presses a spring washer 83 against the auxiliary electrode 71. The spring washer 83, which is shown in its relaxed condition in FIG. 5A, lies against the disk-shaped auxiliary electrode 71 that has both sides provided with a centering surface 73 for the centered allocation of the spring washer 83 and a centering surface 72 for the centered allocation of the spacer/varistor 5 within the projecting region of the clip 24.

Figure 6:
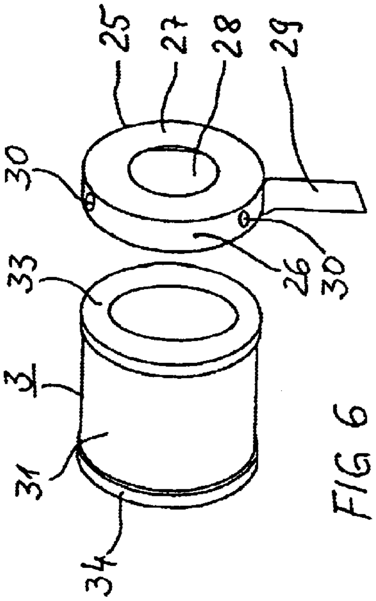
FIG. 6 is a perspective view of a two-electrode arrester with a second embodiment of a clip to be allocated thereto.

FIG. 6 shows a two-electrode arrester 3 with ceramic insulator 31 and end electrodes 33 and 34, whereby a clip 25 in the form of a cap with a hollow-cylindrical edge region 26 and a planar cover or end region 27 provided with a center opening 28 is to be allocated to each electrode. The cap 25 is also implemented with a power terminal 29. In addition, the clip 25 has the circumference of the edge region 26 provided with a plurality of point-like or bead-like impressions 30 that, when the clip or cap 25 is slipped onto an end electrode, the cap resiliently presses onto the foot region of the respective end electrode and forms a contact therewith.

Figure 7:
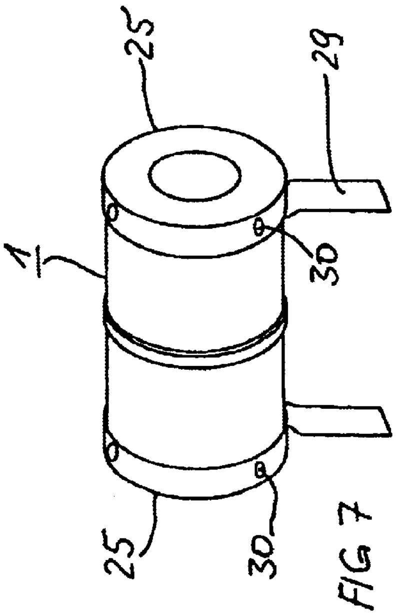
FIG. 7 is a perspective view of a three-electrode arrester with clips in the form of a cap allocated to the end electrodes.
Figure 8:
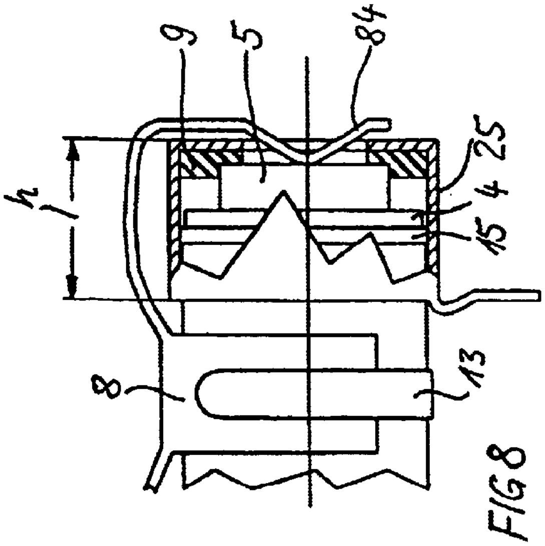
FIG. 8 is a partial side view with portions broken away of a three-electrode arrester with clips according to FIG. 7 and with the short-circuit device, which is combined with an auxiliary discharge path, being allocated to an end electrode.

FIG. 7 shows a three-electrode arrester 1 on whose end electrodes a respective clip or cap 25 is put in place. According to FIG. 8, a three-electrode arrester according to FIG. 7 and the cap 25 can likewise be part of a short-circuit device connected to the middle electrode 13 and can potentially additionally be part of an auxiliary discharge path connected electrically parallel to the gas discharge path of the arrester. The cap 25 has adequate height h in order to be able to receive a fusion disk 4 and a spacer 5 within the cap. The spacer 5 in the form of a varistor is arranged upon employment of an insulating centering member 9 in order to suppress a short-circuit between the free end 84 of the spring clip 8 and the cap 25 in the normal operating condition.

We claim:

1. A gas-filled surge arrester comprising at least two end electrodes with a flange-like foot part, each foot part being soldered to an end face of a hollow-cylindrical ceramic insulator, each foot part being embraced by an electrical terminal, each terminal being a clip tightly fitting the foot part, said clip embracing a part of the axial length of the ceramic insulator adjacent to the foot part, each clip having a terminal projecting radially outward, and means being formed in each clip to cause the clip to be resilient in a circumferential direction.

2. A gas-filled surge arrester according to claim 1, wherein said means is a two-legged clamp-like bend formed in said clip.

3. A gas-filled surge arrester according to claim 1, having a middle third electrode in addition to the two end electrodes, each clip projecting axially beyond the foot part of the respective end electrode, the projecting region being a part of a short-circuit device electrically connected to the middle electrode.

4. A gas-filled surge arrester according to claim 3, wherein parts of an auxiliary discharge circuit electrically parallel to the gas discharge path is additionally allocated to the projecting region of the clip.

5. A gas-filled surge arrester according to claim 4, wherein the short-circuit device comprises a disk-shaped auxiliary electrode having a diameter at least equal to the outside diameter of the clip, said auxiliary electrode being spaced from an edge of the clip by means of a fusion disk and a spacer, which are arranged within the projecting part of the clip, said auxiliary electrode being pressed against the spacer by a spring.

6. A gas-filled surge arrester according to claim 5, wherein the spacer is a varistor.

7. A gas-filled surge arrester according to claim 5, wherein the spring is fixed by means of a U-shaped shackle to the middle electrode.

8. A gas-filled surge arrester according to claim 7, wherein the spring is a spring washer.

9. A gas-filled surge arrester according to claim 7, wherein the spring is a coil spring.

10. A gas-filled surge arrester according to claim 1, wherein the clip has the form of a cap with a hollow-cylindrical edge region and a planar cover region provided with a central opening, and the means is the edge region being provided with a plurality of bead-like, circumferentially spaced impressions lying against the foot part of the respective end electrode.

11. A gas-filled surge arrester according to claim 10, wherein the clip is additionally part of an auxiliary discharge path circuited electrically parallel to the gas discharge path.

12. A gas-filled surge arrester according to claim 10, which includes a middle electrode being arranged between hollow-cylindrical ceramic insulators, the clip projecting axially beyond the foot part of the respective end electrode and a projecting region being part of a short-circuit device which is electrically connected to the middle electrode.

13. A gas-filled surge arrester according to claim 12, wherein the short-circuit device is formed by a planar cover surface of the cap and by an end of a spring clip connected to the center electrode that is free and engaged into the center opening of the cap, the free end of the spring clip being held spaced from the planar cover surface of the cap by means of a fusion disk and the auxiliary discharge path being arranged within the cap and the fusion disk and auxiliary discharge path being insulated from the planar cover of the cap by means of an insulating centering member.

14. A gas-filled surge arrester according to claim 13, wherein the auxiliary discharge path is composed of a varistor that is arranged and insulated by means of the insulating centering member.

15. A gas-filled surge arrester according to claim 1, wherein a middle electrode is arranged between the hollow-cylindrical ceramic insulators, the clip projecting axially beyond a foot part of the respective end electrode, a projecting region being part of a short-circuit device electrically connected to the middle electrode and the means is a two-legged clamp-like bend.

16. A as-filled surge arrester according to claim 15, wherein parts of all auxiliary discharge path circuited electrically parallel to the gas discharge path are additionally allocated to the projecting region of each clip.

17. A gas-filled surge arrester according to claim 16, wherein the short circuit device comprises a disk-shaped auxiliary electrode having a diameter at least equal to the outside diameter of the clip, said auxiliary electrode being held spaced from the edge of the clip by means of a fusion disk and a spacer that are arranged within the projecting part of the clip and said auxiliary electrode being pressed against the spacer by a spring.

18. A gas-filled surge arrester according to claim 17, wherein the spacer is composed of a varistor.

19. A gas-filled surge arrester according to claim 17, wherein the spring is fixed to the middle electrode by a U-shaped shackle.

20. A gas-filled surge arrester according to claim 19, wherein the spring is a spring washer.

* * * * *